July 25, 1967 W. C. HILL ETAL 3,333,250

BUFFERING SYSTEM FOR DATA COMMUNICATION

Filed July 16, 1964 5 Sheets-Sheet 1

INVENTOR.
WILLIAM C. HILL
DONALD J. BIRMINGHAM
BY
Warren F. B. Lindsley

BUFFERING SYSTEM FOR DATA COMMUNICATION

INVENTOR.

BY WILLIAM C. HILL
DONALD J. BIRMINGHAM

Warren F.B. Lindsley

INVENTOR.
WILLIAM C. HILL
DONALD J. BIRMINGHAM
BY
Warren F. B. Lindsley

INVENTOR.
WILLIAM C. HILL
BY DONALD J. BIRMINGHAM
Warren F. B. Lindsley

INVENTOR.
WILLIAM C. HILL
DONALD J. BIRMINGHAM
BY

United States Patent Office 3,333,250

Patented July 25, 1967

3,333,250

BUFFERING SYSTEM FOR DATA COMMUNICATION

William C. Hill and Donald J. Birmingham, Phoenix, Ariz., assignors to General Electric Company, a corporation of New York Filed July 16, 1964, Ser. No. 383,000
16 Claims. (Cl. 340—172.5)

ABSTRACT OF THE DISCLOSURE

A buffering arrangement for connecting a plurality of remote stations with a data processing device employing a data timing unit for indicating predetermined conditions of the data being received from channels of a common carrier facility.

This invention relates to data processing systems and more particularly to buffering arrangements for enabling data processing equipment to receive information from and transmit information over data transmission facilities. This application is a continuation-in-part of the copending application, Ser. No. 301,754, filed Aug. 13, 1963, by Donald J. Birmingham, William C. Hill, Robert A. MacKenzie, Jr., and Buddy J. Pine and entitled, "Data Communication Processor."

The computer, as we know it today, is a significant aid in obtaining timely and efficient business management information. The primary value of this device lies in its ability to digest large volumes of information, perform logical operation on the data, and make decisions based upon established criteria. This ability plus the pressure of competition in the area of customer service has stimulated a desire on managements' part to expand operations further by real time processing of data from many remote facilities such as factories, warehouses, sales offices, and distribution centers. This desire has been fulfilled with the advent of economical data communication systems.

The purpose of a communication system is to transfer information from one location to another. Various means of communicating from one point to another exist today as part of our nation's common and private carrier wire lines, cables, cable carriers, radio and microwave facilities.

Several types of data communication systems are currently available making possible speedy accurate transmission of information from one location to another. Although the various system configurations are basically similar, the size, scope and versatility of any one system depend on the requirements and desires of the user.

The feeding of data in the form of binary digits (bits) over long distance communication lines gives rise to substantial transmission problems. One of these problems is the great disparity between the bit rate transmission of common carrier facilities and the rapidity with which modern data processing systems handle information. It will become obvious, when considering the disparity and speed between a modern data communication processor and the common carrier facilities, that a substantial buffering problem exists when tying the two into a network system. As used herein, buffering is intended to mean the ability of a facility such as a storage register to provide temporary storage of the bits being transferred between the data communication processor and the common carrier facilities. The storage register may comprise a plurality of flip-flops, one flip-flop for each digit to be stored therein. The flip-flop, or bistable multivibrator, is a circuit adapted to operate in either one of two stable states and to transfer from the state in which it is operating to the other stable state upon application of a trigger signal thereto. In one state of operation, the flip-flop represents the binary 1 (1-state) and in the other state the binary 0 (0-state). Many solutions to the buffering problem have been posed, all of which include expensive arrangement of computer hardware and frequently entail expensive and inefficient software programs.

To further complicate the problem of matching communication channels to a data processing system, a variety of bit rates may be presented by the respective channels as well as a variety of codes utilized for representing information. To accommodate this variety of bit rates and codes, it becomes necessary to manipulate the data flow and provide code conversion techniques for translating the communication codes into language of the data processing system. Prior art systems have provided various solutions to this problem; however, these solutions entailed a great deal of expense and unnecessary inefficiency.

Accordingly, it is an object of this invention to provide a novel buffering arrangement for interconnecting remote stations with a data communication processor through common carrier facilities.

Another object of this invention is to provide a buffering arrangement for controlling data transmission among several remote terminals having various transmission bit rate and code characteristics.

A further object of this invention is to provide a new data communications system in which means are provided for storing incoming bit serial information prior to its entry into a data communication device.

A still further object of this invention is to provide a bit sampling device for sampling the pulse code from the common carrier at predetermined times to ascertain the information content of the code and to store that information.

A still further object of this invention is to provide a buffering arrangement for use in interconnecting a remote terminal with a data processing device through common carrier facilities which initiate signals indicating sampling points of the pulses being transmitted over the common carrier facilities.

Further objects and advantages of the present invention will become apparent to those skilled in the art as the description thereof proceeds.

Briefly, in accordance with one embodiment of the present invention, a communication data processing system is provided that utilizes a stored program tailored to fit the particular application involved for implementing arithmetic functions on received or transmitted data. The data processing system is arranged for receiving from and transmitting information to one or more remote stations, over common carrier facilities in the form of bits having various codes and bit rates of transmission.

The buffering of the various common carrier channels to the data processing system is implemented with a unique bit buffering system that enables the bit serial information being received from the respective channels to be stored, one bit at a time, rather than requiring the storage of an entire character or word. The savings in hardware by using the bit buffering system is substantial without detracting from the other operational features of the processing system. Signals are generated by counting means associated with the buffering system to indicate predetermined conditions of the information being transmitted along the respective channels of the common carrier facilities.

The present invention may be more readily described by reference to the accompanying figures in which:

FIG. 6 is a schematic block diagram of a second portion of the bit buffer unit of the present invention;

The present invention relates to data processing systems and particularly to communication apparatus employed in combination therewith. Since it is believed to be unnecessary to describe the well-known details of these systems to completely describe the invention, block diagrams will be used where possible. However, even though known details will be eliminated, a basic description of the entire system will be presented to enable one skilled in the art to understand the environment in which the present invention is placed.

Figure 1:
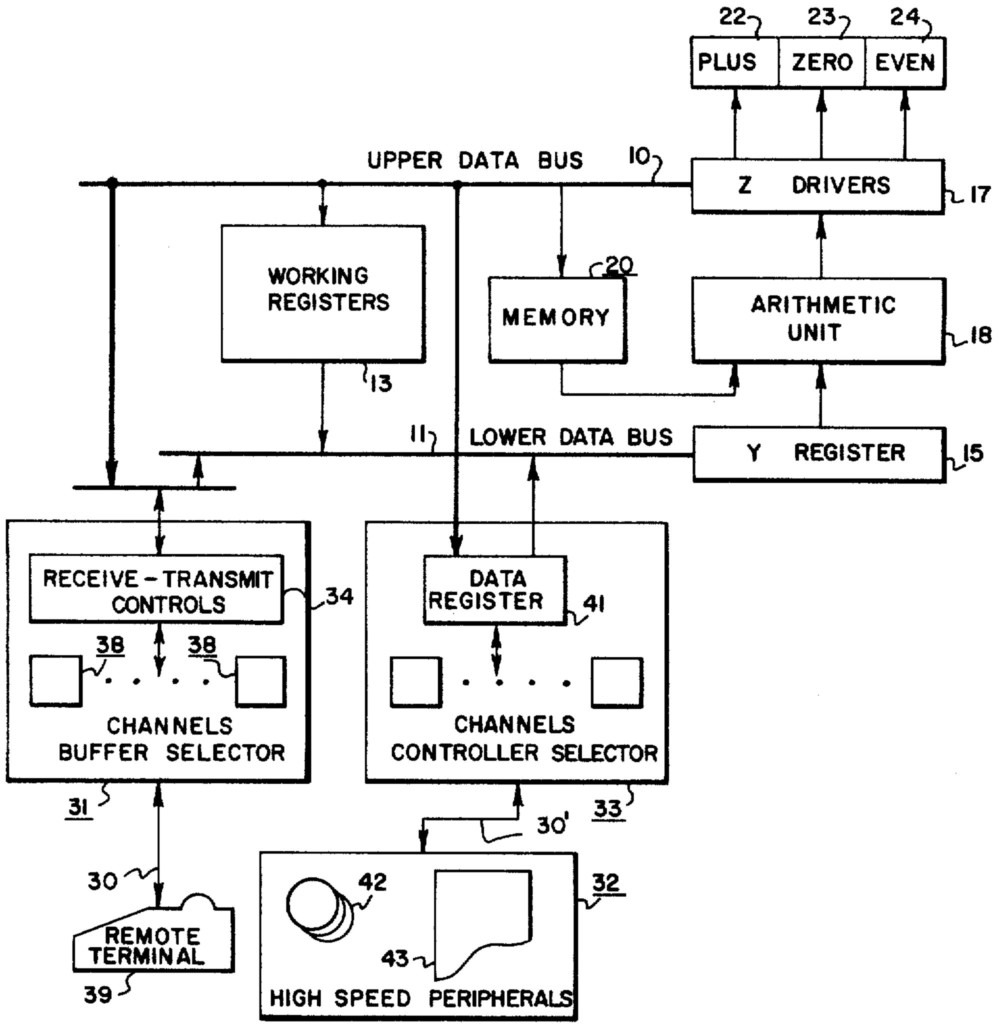
FIG. 1 is a simplified block diagram of a communication processor constructed in accordance with the teaching of the present invention and illustrating data flow from remote terminals and high speed peripherals to and from the communication processor.

Accordingly, reference is made to FIG. 1 showing a simplified block diagram of the data communication processor and its associated peripheral devices and communication buffer units.

FIGURE 1 discloses paths of data and instruction flow in a data communication processor and comprises a processing system employing upper and lower data buses 10 and 11, each of which acts as a main channel for information, including data operands and instructions, moving to and from the information manipulation portion of the system.

An operand is a data word on which an arithmetic or logical operation is performed by the system. An instruction is a data word representing a distinct operation to be executed by the system. A word as used herein is intended to mean a specific group of binary digits which occupies one storage location and is treated by the computer circuits as a unit.

The system is provided with working registers 13 which receive the instructions and data for temporary storage prior to the utilization of this information elsewhere. The data buses 10 and 11 communicate with the working registers 13 and connect the latter to Y register 15 and Z drivers 17. The Y register provides temporary storage for operands prior to the insertion of the operands into the arithmetic unit 18 to be operated upon in accordance with the stored program. A random access memory unit 20 is provided to store instruction and operands. This memory is connected to the arithmetic unit 18 to supply the latter with the necessary information for operation upon the operands received by the arithmetic unit from the Y register.

The arithmetic unit provides the functions of addition, subtraction, the logic functions of AND, OR, exclusive OR as well as shifting functions, such as shift left, shift right, circulate right or left, etc. The results transmitted from the arithmetic unit are supplied to the Z drivers. The Z drivers deliver the results of the computations from the arithmetic unit to memory or to a working register. Three flip-flops 22, 23 and 24 sample the contents of the Z drivers indicating a plus, zero or even condition of the information transmitted by the drivers.

The data processing system as shown in FIG. 1 is also connected to transmission lines such as input/output channels 30 through a buffer selector 31 and to transmission lines such as input/output channels 30' through a controller selector 33. The buffer selector communicates with the data buses, receiving information from the upper data bus and transmitting information to the lower data bus. The information flow in the buffer selector is through receive and transmit controls 34 to any of a plurality of respective channels 30. A buffer unit 38 is provided for each of channels 30. Communicating with the buffer selector is a plurality of remote stations or terminals 39, each connected to a corresponding one of channels 30.

The controller selector 33 receives information from the upper data bus and transmits information to the lower data bus. The information is buffered in the controller selector by a data register 41 which provides information flow to any one of a plurality of channels 30'. Each of channels 30' of the controller selector may be connected to the controller of peripheral devices 32, such as a high speed random access disc memory 42, a high speed printer unit 43, etc.

Figure 2:
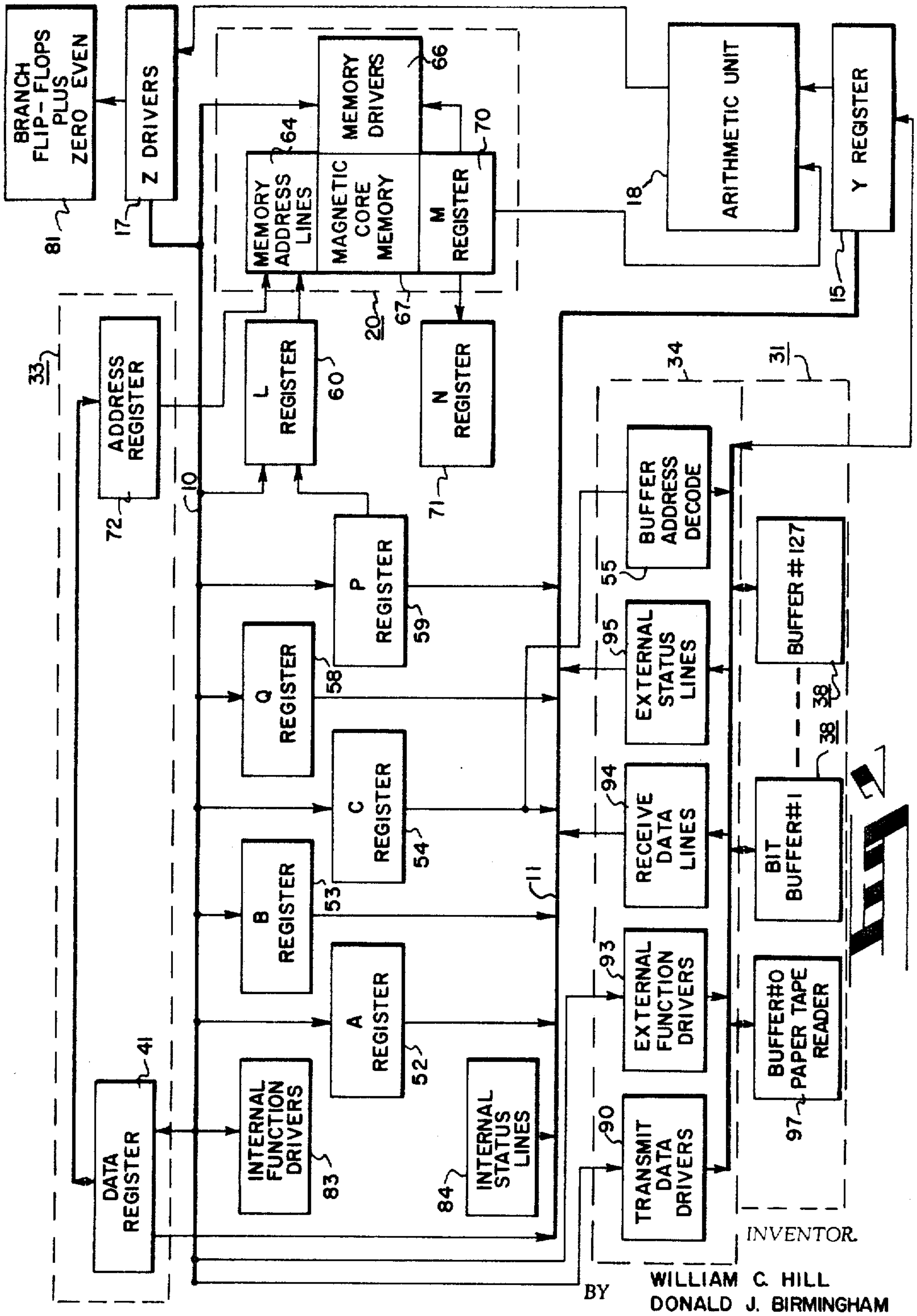
FIG. 2 is an expansion of the block diagram of FIG. 1 showing information flow in the system of the present invention.

Referring to FIG. 2, which is a partial expanded block diagram of the system shown in FIG. 1, the working registers 13 of the processing system are designated as A register 52 and B register 53. Each is an 18 bit register and together they are utilized as the principal working registers of the system. Registers 52 and 53 are arranged to receive information from the upper data bus 10 and transmit information to the lower data bus 11. A.C. register 54 is provided for storing 7 bits. This register is utilized to specify the input/output channel or index register which is utilized to implement indirect addressing of memory. The C register is also arranged to receive information from the upper data bus and deliver information to the lower data bus. It is further arranged to communicate directly with a buffer address decode portion 55 of the receive transmit control 34 of buffer selector 31.

A Q counter 58 is connected to receive information from the upper data bus and delivers information to the lower data bus. This 14 bit counter acts as an elapsed time clock and is instrumental in implementing various features described in more detail in the copending application, Ser. No. 301,754, of which this application is a continuation-in-part.

A 15 bit P counter 59 is connected to the upper data bus and provides information to the lower data bus and to a 15 bit L register 60. The P counter performs the function of storing the memory address of the next instruction and provides this information to the memory address or L register 60. As noted in FIG. 2, the L register also receives information from the upper data bus. The L register communicates directly with memory address lines 64 of the memory unit 20. The memory address lines control selective ones of memory drivers 66 of memory unit 20 for retrieving and storing information in a magnetic core memory 67. An M register 70 of memory unit 20 receives the information retrieved from the magnetic core memory and supplies this information to the memory drivers if such information is to be reinserted at the location in the magnetic core memory from which it was retrieved. M register 70 also supplies a part of the information retrieved to an instruction decoding or N register 71. The memory drivers 66 also receive information directly from the upper data bus 10.

The M register 70 also transmits the retrieved information to arithmetic unit 18. The arithmetic unit also receives information from the 18 bit Y register 15 and provides the results of the computations in the arithmetic unit to the 18 bit configuration of the Z drivers 17. The results obtained in the Z drivers are always sampled by branch flip-flop group 81 comprising flip-flops 22, 23 and 24.

Internal function drivers 83 connected to the upper data bus may be utilized for activating special control functions such as resetting parity bit flip-flops and other housekeeping chores. Internal status lines 84 connected to the lower data bus may be used to test the status of various parity flip-flops (not shown) and to maintain a check on the necessary housekeeping functions performed by the internal function drivers 83.

The upper and lower data buses are illustrated in FIG. 2 as heavy dark lines to indicate that the major data transfers occur over these buses.

The receive transmit controls 34 of buffer selector 31 includes transmit data drivers 90 for communicating information from the upper data bus to the buffer units 38 of the respective channels 30. Also, external function drivers 93 are provided to send control signals to the respective buffer units 38. Corresponding to the transmit data drivers and the external function drivers are the receive data lines 94 and the external status lines 95. The latter units receive information from the respective buffer units 38 in the form of data signals and provide means to ascertain buffer condition. A buffer 97 is allocated to a paper tape reader for transferring into the system a program intended for use in a particular data processing application.

Controller selector 33 including a data register 41 is provided for storing a word of information in a configuration recognizable by the particular peripheral equipment being addressed. The data register 41 receives information from the upper data bus 10, transmits it to one or more of the various peripherals 32 and then to the lower data bus 11. The controller selector 33 also includes an address register 72 for addressing memory unit 20 of the data communication processor to permit information being transferred from the peripherals to the data register 41 to be directed to the magnetic core memory 67 at the appropriate location.

In addition to the communication channels that may be connected into the respective buffer units 38 of the buffer selector 31, another data processing system may also gain access to the data communication processor by connection through one of the respective buffer units. In this manner, one or many data processing systems may be connected via the data communication processor of the present invention to form a computation network gathering and sending information through nationwide common carrier facilities while exchanging information between respective computers and remote locations.

The processing system of the present invention processes data items represented by the binary code such as, for example, data words comprising 18 binary digits (bits). In the binary code, each element of information is represented by a bit being either a 1 or a 0. In the present disclosure, the binary 1 may be represented by a relatively positive electrical signal and the binary 0 by a relatively negative electrical signal. The first digit of the data word is termed the most significant digit and the last digit is termed the least significant digit of the word. The digits between the most significant and the least significant digit are accorded successively decreasing orders of significance.

Two types of operand words are processed, a binary numeric word and an alphanumeric word. The entire binary numeric operand represents a single number of, for example, 18 bits. The first bit of the operand is the most significant digit and the eighteenth bit is the least significant bit. The remaining bits are accorded successively decreasing orders of numerical significance, depending on their respective positions between the most significant and least significant bits.

The alphanumeric operand represents three characters, each character comprising six bits. The alphanumeric character represents any one of the decimal numerals 0–9, any one of the letters of the alphabet, and certain other special symbols such as punctuation marks, etc. The first character is the most significant character and the third character the least significant character. In a character representing a decimal numeral, the two most significant digits are each a binary 0 and the four remaining digits represent the decimal numeral. For example, the character comprising the bits 001001 represent the decimal numeral 9. When an alphabetic letter or another special symbol is represented by a character, at least one of the two most significant digits is a binary 1. Such six digit codes for representing alphanumeric characters are well known in the art.

Two types of instruction are utilized, namely non-general instructions and general instructions. The non-general instructions are those for which the low order bits specify a memory address and another portion thereof specifies a command. The general instructions are those for which the low order bits contain information to be used by the instruction. One format is utilized for non-general instructions and three formats are used for general instructions, register transfer instructions, status line and function driver instructions, and C register instructions.

Each memory address is a numerical representation identifying a respective location in magnetic core memory 67 from which a data item is to be retrieved for processing or in which a processed data item is to be stored in this operation to be executed. Each storage location in magnetic core memory 67 is identified by a different address. The number of address digits actually employed depends on the size of the memory and, hence, the number of locations therein.

Each command represents a specific operation to be executed by the processing system.

Reference is made to the heretofore mentioned copending application for a more detailed description of the instruction words and the identification of the various formats of these words.

It is deemed unnecessary to list all of the instructions available in the communication processing system of the invention. However, to familiarize those skilled in the art with the general data flow in the system, representative instructions will be described in connection with FIG. 2. Basically, during the functioning of the data processor, it is in one of its various phases of operation, for example, the instruction cycle or the operation cycle. In the instruction cycle, the data processor retrieves an instruction from a storage location in memory, transfers, inter alia, the command portion of the instruction to a register where it is decoded, and reinserts the instruction back into memory. In the operation cycle, the data processor receives, processes or transmits data under control of the command provided by the register that received it during the instruction cycle.

More particularly, at the beginning of the instruction cycle, the address of the next instruction is transferred from the P counter 59 to the L register 60, and the P counter is then incremented by one. The contents of the L register are transferred to the memory address lines 64, thus providing readout of the contents of the addressed memory location to the M register 70. After the instruction has been read from the core memory and placed in the M register, the contents of the command portion of the M register are transferred to the N register 71 where the instruction is decoded. Simultaneously, the information in the M register is applied to the memory drivers 66 for reinsertion into the core memory at the same location in the core memory from which it was read out because the information was destroyed when it was read out. After the instruction is decoded, the appropriate section of the arithmetic unit 18 is enabled and the address portion of the instruction is applied to the arithmetic unit from the M register. The result from the arithmetic unit is applied to the Z drivers 17 where it is subsequently transmitted to the L register for addressing the memory unit on the next cycle.

A few execution cycles of the various instructions will be illustrated in order to show the general flow of information in the system in response to these instructions. More detail of the various types of instructions may be obtained by reference to the above identified copending application.

With regard to a "load A register" instruction, the operand address in the L register 60 is transferred to the memory address lines 64 for addressing magnetic core memory 67. The contents at the specified address in the magnetic core memory are read into the M register 70 and transferred through the arithmetic unit 18 unchanged to the Z drivers 17. The contents of the Z drivers are transferred to the A register 52. Simultaneously with the transfer of the contents of the M register to the arithmetic unit, the contents of the M register are being regenerated by the memory drivers 66 and reinserted into the magnetic core memory. The branch flip-flop group 81 stores the plus, zero, and even conditions of the contents of the magnetic core memory at this location.

With regard to the "store B register" instruction, the operand address in the L register 60 is transferred to the memory address lines 64 for addressing magnetic core memory 67. The contents of the B register 53 are transferred to the Y register 15 while the memory is being read out. The information read out, however, is not used since this is a "store B register" instruction. The contents of the Y register are then transferred to the Z drivers 17 through the arithmetic unit 18. The Z drivers, via the upper data bus, apply the contents thereof to the memory driver 66 for generation into the memory unit at the location specified by the L register. Thus, the contents of the B register have been transferred to the magnetic core memory at the address specified by the contents of the L register. Branch flip-flop group 81 stores the plus, zero, and even conditions of the contents of the B register.

The execution cycle of the instruction "add memory to A register" will also be described with regard to FIG. 2. The operand address in the L register 60 is transferred to the memory address lines 64 for addressing magnetic core memory 67. While the memory is being read out, the contents of the A register 52 are transferred to the Y register 15. The contents of the magnetic core memory at the location specified by the L register are placed in the M register 70 and transferred to the arithmetic unit 18 simultaneously with the transfer of the contents of the A register through the Y register. The binary arithmetic sum of the M register and A register is generated by the arithmetic unit and transferred to the Z drivers 17. The sum present in the Z drivers is transferred to the A register while the contents of the M register are applied to the memory drivers for regeneration and reinsertion of the information in the magnetic core memory. The branch flip-flops store a plus, zero, and even condition of the binary arithmetic sum of the A register and the addressed memory location.

The above description of execution cycles of the various instructions illustrate the general information flow in the system in response to respective instructions.

Figures 3, 4, 5:
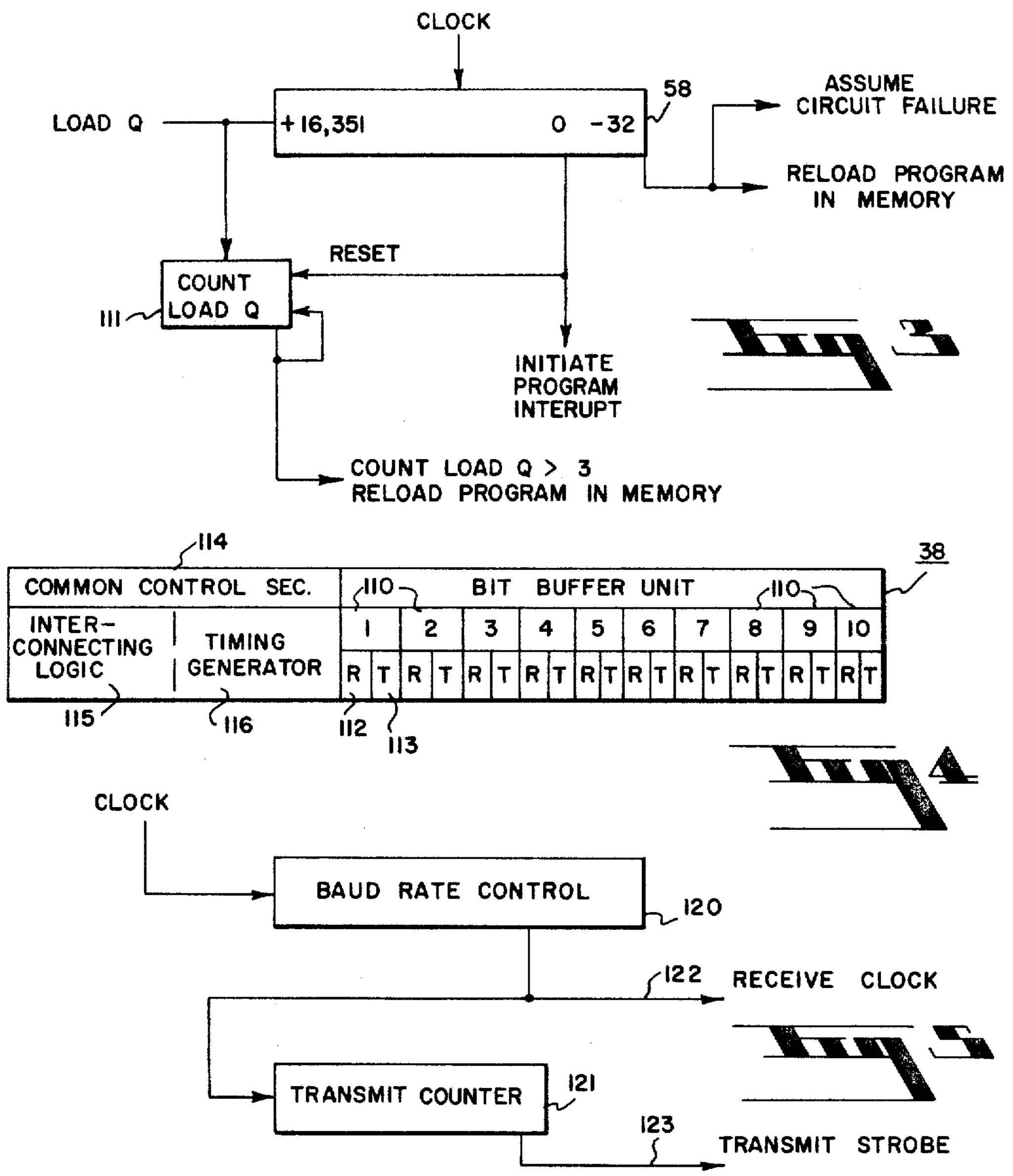
FIG. 3 is a schematic block diagram of a Q counter of the present invention.
FIG. 4 is a diagramatic illustration of a bit buffer structure designed for servicing ten communication channels.
FIG. 5 is a schematic block diagram of a portion of the bit buffer unit of the present invention.
Figure 4:
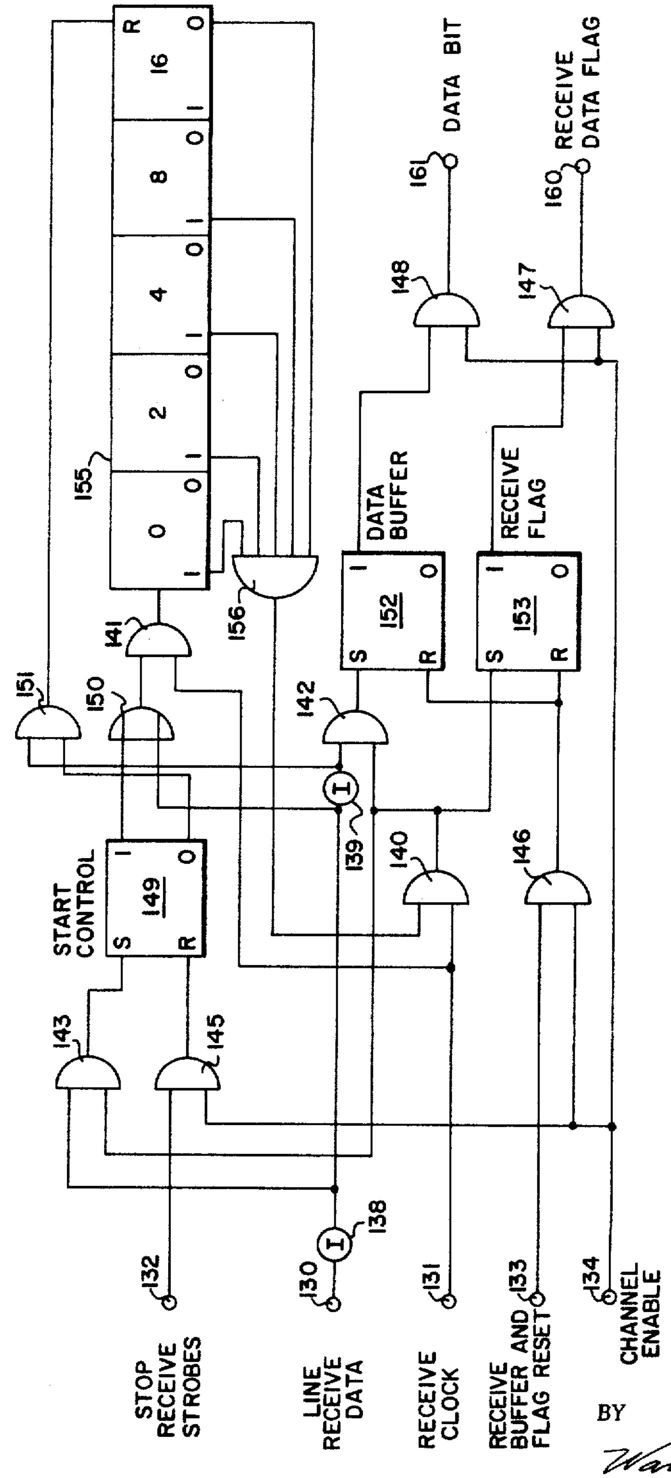

The unique provisions for timing and servicing the bit buffer units is obtained through the utilization of the real time clock or Q counter 58. FIGURE 3 illustrates a schematic block diagram of the Q counter 58 which is illustrated as being a 14 bit counter of any well-known construction. The Q counter 58 is initially loaded by a load Q command. The particular number will depend on the time desired before the counter is decremented to zero. In the embodiment shown in FIG. 3, the maximum number which can be loaded into the Q counter is defined as +16,351. The counter receives a clock pulse signal and is decremented by one for each clock pulse signal received. The clock pulse signal is a regularly produced signal provided by the data processor. Simultaneously with the application of the load Q signal to the Q counter, the signal is applied to a "count load Q counter" 111 which records the number of times the Q counter has been loaded between program interrupts. A program is a planned sequence of operations dependent upon the way the computer has been organized to solve a problem, complete a numerical analysis, etc. The solution of the problem or completion of the analysis is accomplished through the execution of a list of instructions identified in the program. Program interrupt is the term used when the program of the data processor has been interrupted by a signal, thereby stopping at least temporarily the step by step sequence of operation of the data processor.

When the Q counter 58 is decremented to a value defined as zero, an initiate program interrupt signal is supplied by the counter to permit the system to interrupt the program and service channels having information to be received, and to service those channels for which the processor has information for transmittal. The program interrupt causes one or more subroutines to be initiated. The Q counter, however, continues to count. The subroutine instigated by the program interrupt signal from the Q counter is charged with the responsibility of resetting the Q counter 58 before the counter reaches a minus 32 count which is the actual zero of the counter. If the subroutine or if that portion of the program controlling after program interrupt fails to load the Q counter by the end of the minus 32 count, the Q counter initiates a reload signal which automatically reloads the program in the appropriate locations in memory from the program stored on the paper tape unit connected to the paper tape buffer of the buffer selector. An appropriate warning signal is also provided simultaneously with the reload signal indicating that the Q counter was not reset at the proper times.

The count load Q counter 111 maintains a count of load Q signals applied to the Q counter. The count load Q counter is reset when the counter reaches a zero count and a program interrupt signal is initiated. However, if the count load Q counter reaches a count of three, a reload program in memory signal is generated to automatically reload the program in the appropriate locations in memory from the paper tape in a manner similar to that when the Q counter counted to minus 32. Simultaneously with the latter action, the count load Q counter is reset to zero. The function of the latter counter prevents a program dead loop that continuously reloads the Q counter without permitting the counter to count to zero, thereby initiating a program interrupt. The prevention of a loop of this sort reduces the probability of information, which has come in on the channels and has not been picked up and transmitted by the data processor, from being lost. Thus, the Q counter insures proper operation of the programs by detecting when programs fail to initiate a load Q counter. The Q counter also protects against dead loops, including instructions to load the Q counter by counting the number of times the counter has been loaded since the last program interrupt. Further, by initiating a program interrupt at a count of zero, the Q counter insures the periodic execution of appropriate programs to service channels, thereby prohibiting the loss of information present at the incoming channel.

The data communication processor of the present invention includes a bit buffer unit which facilitates the connection of the processor to the respective incoming and outgoing channels. Each buffer unit provides temporary storage for a single bit of information until the processor addresses the respective buffer unit and retrieves the stored information. Obviously, since there are several incoming lines, the processor will have to address each of the buffer units in sufficient time to permit the retrieval of the respective stored information in all buffer units before the succeeding bits are received over the transmission lines. Since the bit rate of the data transmission system is substantially slower than the operating speeds of the data processor, the processor can readily address sequentially all of the buffer units and have sufficient time to carry on processing in accordance with a store program before having to return to the buffer units to retrieve further information. The buffer units also serve the purpose of storing bits of information provided to the buffer by the data communication process prior to sending the bits of information over the transmission facilities. The bit buffer unit of the data communication processor of the present invention is schematically shown in FIGS. 4, 5, 6, and 8.

FIGURE 4 illustrates the bit buffer unit 38 as comprising at least 10 bit buffers 110, each of which comprises receive and transmit registers 112 and 113, a common control section 114 employing the necessary interconnecting logic 115 and timing generator 116. Each of the ten bit buffers connects a remote terminal with the data communication processor and is completely independent of the other bit buffers except that all must operate at the same bit rate as determined by the timing generator in the common control section of the bit buffer unit.

The interconnecting logic 115 of the buffer unit 38 provides one line for data and control signals to or from the data communication processor. Which, if any, of the ten bit buffers is actually transferring signals to or from the data communication processor is determined by the buffer address decode logic 34 in the buffer selector 31. The timing generator provides the basic timing at which all of the bit buffers operate.

FIGURE 5 illustrates the timing generator 116 of the buffer unit 38 shown in FIG. 4 and comprises a baud rate counter 120 and a transmit counter 121. The term baud rate as used herein is intended to define the operating speed of the flow of information through channels 30, namely, bits per second. The baud rate counter 120 is shown receiving clock pulses from the clock source of the data communication processor and produces output pulses at a frequency that is a sub-multiple of the clock pulse frequency received. The clock pulse frequency provided by the data communication processor is 144 kc. and it is reduced by counter 120 to a value usable for data receive and transmission purposes. The output pulse frequency of counter 120 is 32 times the baud rate of the communication channels 30. These pulses are utilized as receive clock pulses on lead 122 by the receive portion of the ten buffers 110 of the buffer units 38 and are also applied to the transmit counter 121. Transmit counter 121 produces new pulses responsive to the output of the baud rate counter having a frequency equal to the actual baud being utilized by the terminal equipment. The baud rate may be any of the transmission rates commonly acceptable to the common carriers and is usually in the order of 45 to 3,000 bits per second. Accordingly, the output of the transmit counter 121 is a sequence of pulses having a frequency equal to the baud rate of the common carrier facilities being serviced by the corresponding buffers. The output of the transmit counter 121 provides a sequence of transmit strobe pulses on lead 123 which strobe pulses are used by the transmit portion of the ten buffers of the bit buffer units 38 for controlling the time of transfer of the output pulses from the data processor to the transmission lines.

The portion of the bit buffer units relating to the receive function for a given channel 30 is shown in FIG. 6. The inputs to the bit buffer unit for the receive function comprise the data signals applied to terminal 130 receive from channels 30, the receive clock pulse signals applied to terminal 131 from the baud rate counter of FIG. 5, a stop-receive strobe signal applied to terminal 132 from the data communication processor, a receive buffer and flag reset signal applied to terminal 133 from the data communication processor, and a signal applied to terminal 134 to enable the specific channel to exchange signals with the data communication processor.

The receive clock signals derived from baud rate counter 120 and received by terminal 131 are simultaneously applied to respective input terminals of AND-gates 140 and 141. The signals received by terminal 130 are simultaneously applied through inverter 138 to input terminals of AND-gates 143 and 151 and OR-gate 150 and through inverters 138 and 139 to an input terminal of AND-gate 142. The channel enable signals applied to terminal 134 are simultaneously applied to an input terminal of each of AND-gates 145, 146, 147 and 148. The stop-receive strobe signal received by terminal 132 is applied to an input terminal of AND-gate 145, and the receive buffer and flag reset signal received by the terminal 133 is applied to an input terminal of AND-gate 146.

The AND-gates disclosed provide the logical operation of conjunction for binary 1 signals applied thereto. In the system disclosed, since the binary 1 is represented by a positive signal, the AND-gate provides a positive output signal representing a binary 1 when, and only when, all of the input signals applied thereto are positive and represent binary 1's. The symbol identified by the numerals 140, 141, 145, 146, 147 and 148, inter alia, in FIG. 6 represent a two-input AND-gate. Such an AND-gate delivers a binary 1 output signal only when each of the two input signals applied thereto represent a binary 1. A four-input AND-gate, as represented by AND-gate 156, later described, delivers a binary 1 output signal only when each of the four input signals applied thereto represents a binary 1.

The OR-gate disclosed provides the logical operation of inclusive-OR for binary 1 input signals applied thereto. In the system, since the binary 1 is represented by a positive signal, the OR-gate provides a positive output signal representing a binary 1 when any one or more of the input signals applied thereto are positive and represent binary 1's. The symbol identified by gate 150 in FIG. 6 represents a two-input OR-gate. Such an OR-gate delivers a binary 1 output signal when any one or both of the input signals applied thereto represent binary 1's.

The inverters disclosed provide the logical operation of inversion for an input signal applied thereto. The inverter provides a positive output signal representing a binary 1 when the input signal applied thereto is negative, representing a binary 0. Conversely, the inverter provides an output signal representing a binary 0 when the input signal represents a binary 1. The symbols identified by numerals 138 and 139 represent such inverters.

Three flip-flops are provided in the receive portion of the bit buffer unit as shown in FIG. 6. The flip-flops provide temporary storage of a binary digit of a data word or provide temporary storage of a control signal. Generally, when a flip-flop is employed to store a data word digit, it comprises one of an array of flip-flops termed a register. The symbols identified by the numerals 149, 152 and 153, inter alia, in FIG. 6 represent flip-flops. The flip-flop, or bistable multivibrator, is a circuit adapted to operate in either one of two stable states and to transfer from the state in which it is operating to the other stable state upon application of a trigger signal thereto. In one state of operation, the flip-flop represents the binary 1 (1-state) and in the other state, the binary 0 (0-state). The two leads entering the left-hand side of the flip-flop symbols shown in FIG. 6 provide the two required trigger signals. The upper input lead, the set input lead, provides the set signal and the lower input lead, the reset input lead, provides the reset input signal. When the set input signal goes positive, the flip-flop is transferred to its 1-state, if it is not already in the 1-state. When the reset input signal goes positive, the flip-flop is transferred to its 0-state, if it is not already in the 0-state. The two leads leaving the right-hand side of the flip-flop symbol deliver the two output signals. The upper output lead, the 1 output lead, delivers the 1 output signal of the flip-flop and the lower output lead, the 0 output lead, delivers the 0 output signal.

The 1 output terminal of the start control flip-flop 149 is connected to an input terminal of OR-gate 150 and when flip-flop 149 is set, it enables OR-gate 150. The 0 output terminal of flip-flop 149 is connected to an input terminal of AND-gate 151 and when flip-flop 149 is reset, it enables AND-gate 151. A data buffer flip-flop 152 is connected through its 1 output terminal to the other input terminal of AND-gate 148, and the receive flag flip-flop 153 is connected through its 1 output terminal to the other input terminal of AND-gate 147.

A counter 155 comprising five cascaded flip-flops is shown connected to the output lead of AND-gate 141. Each flip-flop or stage of the counter 155 is connected to a different input lead of AND-gate 156. The output lead of AND-gate 156 is connected to the other input lead of AND-gate 140. The counter 155 is a five bit binary counter which, when considering the left-most flip-flop as representing the lowest order of binary value, will cause AND-gate 156 to provide an output signal when the number represented thereby reaches the decimal number 15. The output of AND-gate 156 will enable the passage of the next receive clock signal through AND-gate 140. The same receive clock signal causes the counter to count to a decimal 16. Thus, AND-gate 156 will provide an output signal upon the conjunctive combination therein of the output signals of the respective flip-flops of counter 155 when the count 15 is reached and will provide an output signal thereafter every 32 clock pulses. The counter continues counting after reaching the count of 16 with each clock pulse until it reaches the count of 31 and then it resets to 0 on the thirty-second count. Although a counter has been shown and described, any other type of device may be used, such as one that repetitively assumes a predetermined number of different states in succession.

Figure 7:
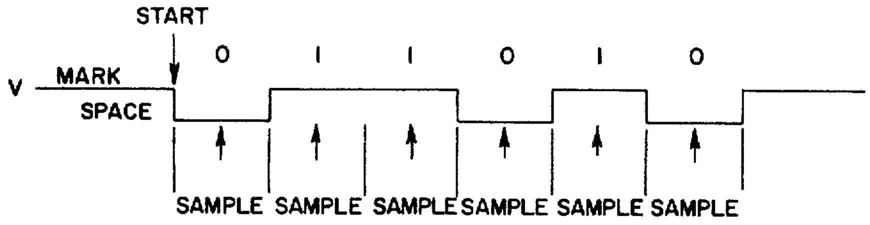
FIG. 7 is a schematic illustration of an incoming pulse-coded character useful for illustrating the manner in which incoming information is sampled to determine the information content thereof.

FIGURE 7 illustrates the incoming data signal applied to terminal 130 shown in FIG. 6. According to well-known Teletype techinques, the data applied to terminal 130 is in the form of pulses of two significant values which may, for example, represent relatively negative or positive values of voltage. For the purpose of the following description, it will be understood that the line signal code employed to transmit a character consists of five data signals used in various combinations of "marking" and "spacing" intervals. Each group of five signals is preceded by a start or initial pulse and is usually followed by a rest pulse to maintain unison between the transmitting equipment such as the data communication processor and the remote receiving equipment such as the remote terminal 39. Depending on the code utilized, however, the number of succeeding signals after the start or initial pulse and before the rest pulse may vary considerably.

The initial drop in voltage, as shown in FIG. 7, from the mark designation to the space designation, represents the start of the start pulse. Each character may represent any one of the decimal numerals 0–9, any one of the letters of the alphabet, and certain other special symbols such as punctuation marks, etc. Each character, as shown in FIG. 7, contains information periods, one for each bit received, wherein the data varies according to the type of signal received. A mark which occurs for two successive information periods would result in two bits of information received during two information periods. A single mark or space would be one information period. Thus, an information period as considered herein is the bit period which is 32 times the duration of a receive clock pulse applied to terminal 131.

Keeping in mind FIG. 7, which shows the relative signal levels of the input information, the operation of the invention illustrated by the schematic diagram of FIG. 6 is as follows: When a particular bit buffer unit receives information from the transmission line applied to terminal 130, and receive clock signals are also applied to terminal 131, the receive clock signals are conjunctively combined in AND-gate 141 with the output signal of OR-gate 150. OR-gate 150 received the start pulse applied to terminal 130 in inverted form and provided the enabling signal to AND-gate 141. AND-gate 141 then provides output pulses to counter 155 which pulses are representative of the clock pulses applied to it. These representative clock pulses actuate counter 155 successively with each clock pulse received by AND-gate 141. As counter 155 counts from its reset value of 0 to the count of 15, the output signals of the counter are applied to the four input terminals of AND-gate 156. At the count of 15, the output signals of counter 155 are conjunctively combined in AND-gate 156 and the resulting output signal of AND-gate 156 is then applied to AND-gate 140. As disclosed herein, the term "sampling means" is intended to comprise, inter alia, one or more of counter 155 and the associated gates 141, 142, 143, 145, 150, 151 and 156 and flip-flop 149. One or more of these devices is arranged for sampling the level of each of the signals arriving at terminal 130 at similar or predetermined places in the corresponding information periods.

When the conditions for conjunction in AND-gate 140 have been satisfied, upon the receipt of receive clock signals from terminal 131 and the output signal from AND-gate 156, an output or sampling signal from AND-gate 140 is applied simultaneously to AND-gates 142 and 143 and to the set input terminal of flip-flop 153. Since the start pulse still exists at terminal 130, AND-gate 143 provides an output signal to the set input terminal of start control flip-flop 149. This signal sets flip-flop 149 to its 1-state. When flip-flop 149 is in its 1-state, the signal from its 1 output terminal is applied to OR-gate 150 and the output signal from OR-gate 150 is utilized to enable AND-gate 141 causing counter 155 to continue receiving representative clock pulses after the count of 16 and after the start pulse has disappeared.

The output sampling signal of AND-gate 140 applied to AND-gate 142 enables AND-gate 142 causing it to apply a pulse to the set input terminal of flip-flop 152 whenever a mark or 1 bit is received at terminal 130. Since the conditions for conjunction in AND-gate 142 are not satisfied by the receipt of a space or 0 bit at terminal 130, a 0 bit from terminal 130 is not transferable to flip-flop 152. Flip-flop 152 is transferred to its 0-state by a signal applied to its reset terminal by the program of the data communication processor and will be explained more fully later.

The receive flag flip-flop 153 is set by the output signal of AND-gate 140. The output signal of flip-flop 153, in conjunction with a channel enable signal from terminal 134, causes AND-gate 147 to provide a receive data flag signal at terminal 160 indicating that an information period having either a mark or space (1 or 0) bit signal is available at the data bit terminal 161. If flip-flop 152 had been set by an output signal from AND-gate 142, then the data appearing at terminal 161 would be a mark or 1 bit. If flip-flop 152 had not been set by an output signal from AND-gate 142, then the data appearing at terminal 161 would be a space or 0 bit.

After each bit of information has been received by the data communication processor from terminal 161, the program of the processor provides a receive buffer and flag reset signal to terminal 133. This reset signal is conjunctively combined in AND-gate 146 with the channel enable signal applied to terminal 134 and the output signal from AND-gate 146 is applied to the reset terminals of flip-flops 152 and 153. Data buffer flip-flop 152 is reset or cleared after each data bit is transferred to the data communication processor if it is not already in its reset or cleared condition.

Every time counter 155 reaches the count of 16, receive flag flip-flop 153 is set to the 1-state by the output signal of AND-gate 140. The data buffer flip-flop 152 is also set to the 1-state if the input digit applied to terminal 130 is a mark or binary 1. If the data buffer flip-flop 152 is not set to the 1-state because of a space or binary 0 appearing at terminal 130, then flip-flop 152 remains in the rest stage, indicative of the space condition at terminal 130. During the receipt of a character at terminal 130, AND-gate 151 is disabled, thereby rendering it impossible to reset counter 155.

The described action continues until the data communication processor determines a full character has been received. At that time, the data communication processor provides a stop-receive strobe signal at terminal 132 which enables AND-gate 145. AND-gate 145, upon receipt of a channel enable signal applied to terminal 134, provides an output signal to reset start control flip-flop 149. The output signal from the 0 terminal of flip-flop 149 in combination with the receipt of a mark or rest pulse at the end of the Teletype character on the line receive data terminal 130 disables OR-gate 150, which in turn disables AND-gate 141 and stops the counting of counter 155. This output signal from the 0 terminal of flip-flop 149 in combination with the mark or rest pulse on the receive data terminal 130 enables AND-gate 151 which provides a signal to the reset terminal of counter 155 to return the counter to a reset or zero state to await the receipt by the system of the next start bit.

The receive portion of the bit buffer unit of FIG. 6 is activated upon sensing the start pulse of a character. Since the receive clock pulse applied to terminal 131 is at 32 times the baud rate (bit rate), the bit buffer receive portion of the system is activated 32 times each information period.

Upon activating the receive portion of the system illustrated in FIG. 6 by the start pulse, counter 155 initially counts to 16 and upon reaching that count, causes AND-gate 156 to provide an output signal setting flag flip-flop 153. After the initial count of 16, AND-gate 156 provides output signals every 32 clock pulse periods. Thus, the pulses following the start pulse of the character being received by terminal 130 are sampled at $^{16}/_{32}$ of each of the information periods. This provides a pulse that samples the midpoint of each data bit pulse received at line receive data terminal 130. Although the midpoint of each pulse has been designated as a sampling point, it is possible to arrange the circuitry to sample the pulses at any predetermined point during the pulse period. This may be accomplished by producing an output signal from AND-gate 156 at a count other than 15 of counter 155.

Figure 8:
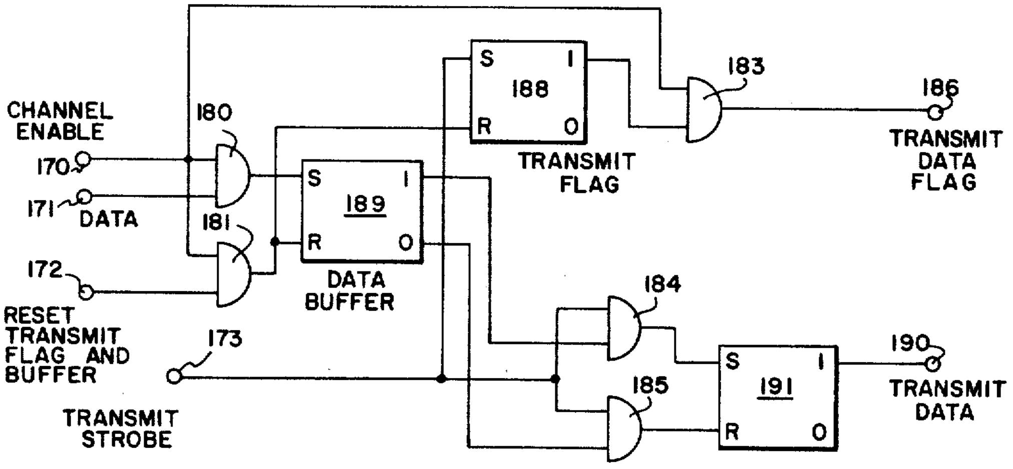
FIG. 8 is a schematic block diagram of a third portion of the bit buffer unit of the present invention.

The transmit portion of the bit buffer unit of the present invention is shown in FIG. 8. The channel enable signal, the same signal applied to terminal 134 of FIG. 6, is applied to terminal 170. The data to be transmitted, one bit at a time, provided by the data communication processor, is applied to terminal 171. The reset transmit flag and buffer signal, provided by the data communication processor, is applied to terminal 172. The transmit strobe signal from the transmit counter 121 of FIG. 5 is applied to terminal 173. The channel enable signal is applied from terminal 170 to AND-gates 180, 181 and 183. The transmit strobe signal is applied to the set input terminal of the transmit flag flip-flop 188 and to an input terminal of each of AND-gates 184 and 185. The reset transmit flag and buffer signal is conjunctively combined in AND-gate 181 with the channel enable signal from terminal 170 and the output signal thereof is applied to the reset input terminal of the data buffer flip-flop 189 and to the reset input terminal of the transmit flag flip-flop 188.

The data signals to be transmitted, one bit at a time, are conjunctively combined in AND-gate 180 with the channel enable signal and the output signal of AND-gate 180 is applied to the set input terminal of data buffer flip-flop 189, thereby causing a bit transfer from the data communication processor to the data buffer. The signals of the 1 output terminal of the transmit flag flip-flop 188 is conjunctively combined in AND-gate 183 with a channel enable signal to provide a transmit data flag signal at terminal 186. The signals from the 1 and 0 output terminals of the data buffer flip-flop 189 are applied, respectively, to input terminals of AND-gates 184 and 185 to be conjunctively combined therein with the transmit strobe signals applied to terminal 173. The output signals from AND-gates 184 and 185 are connected to the set and reset terminals, respectively, of the transmit line flip-flop 191. The signals of the 1 output terminal of transmit line flip-flop 191 provide transmit data signals at terminal 190.

The operation of the transmit portion of the bit buffer unit may be described as follows. When a particular channel is to transfer signals from the data communication processor, the channel enable signal will enable AND-gates 180, 181 and 183. The transmit strobe signals applied to terminal 173 are provided by the transmit counter 121 of FIG. 5 and occur at the desired baud rate. The data signals to be transmitted are conjunctively combined in AND-gate 180 with the channel enable signals and an output signal from AND-gate 180 is applied to the set input terminal of the data buffer flip-flop 189. If the particular data is a 1 bit, the data buffer flip-flop 189 will assume a 1-state. If the particular data is a 0 bit, flip-flop 189 will maintain its 0-state assumed at the time the flip-flop was reset after transmission of the prior bit through terminal 190. Thus, the voltage level of the output terminal of flip-flop 189 will depend on the value of the input binary bit applied to data terminal 171.

The value of the bit stored in data buffer flip-flop 189 is applied to AND-gates 184 and 185. If the output signal from data buffer flip-flop 189 is of the proper logic level to cause AND-gate 184 to provide a binary 1 output signal, then the inverse of this signal applied to AND-gate 185 will prevent AND-gate 185 from providing a binary 1 output signal. Only one of the AND-gates 184 and 185 will be enabled for gating a triggering logic level to the transmit line flip-flop 191 when each of the AND-gates is simultaneously strobed by the transmit strobe signal applied to terminal 173. This gating action occurs at the baud rate of the channel interconnecting the peripheral device and the data buffer 189. Depending on the logic value of the bit stored in data buffer flip-flop 189, the transmit line flip-flop 191 will either be set or reset. The setting of flip-flop 191 provides a 1 bit output signal at terminal 190.

Simultaneouly with the appearance of a data bit at terminal 190, the flag flip-flop 188 is set by the transmit strobe signal at terminal 173. The signal from the 1 output terminal of flip-flop 188 is conjunctively combined in AND-gate 183 with the channel enable signal from terminal 170 to provide an output signal at terminal 186 indicating that a data bit is available at terminal 190 for transmission to a remote terminal 39.

Immediately after transmission of the data bit through terminal 190, a reset transmit flag and buffer signal is provided by the data communication device at terminal 172. This signal is conjunctively combined in AND-gate 181 with a channel enable signal from terminal 170 and an output signal from AND-gate 181 is provided to reset flip-flops 188 and 189. The resetting of flip-flop 189 provides a singal at its 0 output terminal which is conjunctively combined in AND-gate 185 with the transmit strobe signal from terminal 173 to provide an output signal for resetting flip-flop 191. Thus, flip-flop 191 is reset after the transmission of each bit and if a 0 bit appears at data terminal 171, the bit transferred from flip-flop 191 through terminal 190 is a 0 bit which represents the reset condition of flip-flop 191. Flip-flop 191 is only set upon the occurrence of a 1 bit at terminal 171.

Thus, the transmit section of the appropriate buffer unit receives the data to be transmitted from the data communication processor and stores the data (a single bit at a time) in the data buffer flip-flop. A transmit strobe is provided at the appropriate baud rate from the transmit counter of the conrtol section of the bit buffer unit. The information, previously stored in the data buffer, is subsequently transmitted to the remote terminals or stations at the appropriate baud rate. Each time the data communication processor is ready to put a new bit of information into the data buffer, the flag and data flip-flops are reset by the application of a reset transmit flag and buffer signal from the data processor. The new data bit is then inserted into the data buffer to be transmitted to the remote terminal by the next transmit strobe.

It will be obvious to those skilled in the art that the AND-gates, OR-gates, flip-flops and counters described herein in connection with FIGS. 5, 6, 7, and 8 may take any of the usual forms commonly found in the data processing art. For example, the logic gates may be conventional diode gates or transistorized gating logic commonly known as "nor" logic. Similarly, the flip-flops having set and reset input terminals provide logic levels at both the 1 and 0 output terminals each of which may either be a 1 bit voltage level or a 0 bit voltage level. Thus, the 1 output at a given flip-flop may either be a binary 1 or a binary 0, and the contents of the flip-flop may readily be sampled merely by detecting the voltage level at either the 1 or the 0 output terminal.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A buffering system for receiving data signals wherein said signals follow an initial pulse and are supplied during a succeeding series of information periods, the level of the signals in the information periods representing the data being supplied, said buffering system comprising a first means arranged to receive information in the form of signals transmitted over a transmission facility, and a second means responsive to the receipt of said initial pulse by said first means for sampling at the same point the level of each succeeding signal in said information periods.

2. A buffering system for receiving data signals wherein said signals follow an initial pulse and are supplied during a succeeding series of information periods, the level of the signals in the information period representing the data being supplied, said buffering system comprising a first means connected to receive binary digit serial information in the form of signals transmitted over a transmission facility, and a second means responsive to the receipt of said initial pulse by said first means for sampling the level of each succeeding signal at the middle of each of the corresponding information periods.

3. In combination, a buffering means for interconnecting a plurality of remote stations with a data processing device; said buffering means being arranged for receiving binary digit serial information from said stations in the form of data signals transmitted over transmission facilities, said signals follow an initial pulse and are supplied during a succeeding series of information periods, the level of the signals in the information periods representing the data being supplied; sampling means responsive to receipt of said initial pulse by said buffering means and actuated upon receipt of a sampling signal for sampling the level of each succeeding signal at the same point of each of the corresponding information periods, said sampling means comprising a third means responsive to said pulse for assuming a plurality of different states in succession; and a fourth means responsive to a given state of said third means for generating said sampling signal.

4. In combination, a single binary digit buffering means for interconnecting a plurality of remote stations with a data processing device, said buffering means being arranged for receiving binary digit serial information from said stations in the form of data signals transmitted over common carrier facilities; said signals follow an initial pulse and are supplied during a succeeding series of information periods, the level of the signals in the information periods representing the data being supplied; sampling means responsive to said initial pulse received by said buffering means and actuated by a sampling signal for sampling the level of each succeeding signal at the middle of each of the corresponding information periods, said sampling means comprising a counter responsive to said initial pulse for assuming a predetermined count and changing said count at a given rate, and means responsive to a given count of said counter for generating a sampling signal.

5. In a data communication processor responsive to a stored program for receiving, manipulating and transmitting data, buffer means connected to receive and transmit bit serial information from and to remote stations in the form of pulses transmitted over common carrier facilities; a baud rate counter for providing receive clock signals at a multiple of the common carrier baud rate; means responsive to the first pulse received by said buffer for counting at said multiple of the baud rate and for generating a sampling signal at a count equal to half said multiple and at every count thereafter equal to said multiple; bit storage means connected to receive pulses from remote stations and to receive said sampling signal for storing the binary value of said pulses when said sampling signal is received; means connected to said baud rate counter for generating transmit strobe signals at the common carrier baud rate; second bit storage means connected to receive information to be transmitted; means connected to said second bit storage means responsive to said transmit strobe signal for transmitting information stored in said second bit storage means.

6. A buffering system for receiving data signals wherein said signals follow an initial pulse and are supplied during a succeeding series of information periods, the level of the signals in the information periods representing the data being supplied, said buffering system comprising a first means arranged to receive binary digit serial information from a remote station in the form of signals transmitted over a common carrier facility, said first means comprising a device for generating clock signals at a multiple of the common carrier baud rate; a second means responsive to the receipt of said initial pulse by said first means and to said clock signals for counting at said multiple of the baud rate and for generating a sampling signal at a given count and at every count thereafter equal to said given count; and binary digit storage means connected to receive said signals and responsive to said sampling signal for storing the binary value of said signals when said sampling signal occurs.

7. A buffering system for receiving data signals wherein said signals follow an initial pulse and are supplied during a succeeding series of information periods, the level of the signals in the information periods representing the data being supplied, said buffering system comprising a first means connected to receive binary digit serial information from a remote station in the form of signals transmitted over a common carrier facility, said first means comprising a device for generating clock signals at a multiple of the common carrier baud rate; a second means responsive to the receipt of said initial pulse by said first means and to said clock signals for counting at said multiple of the baud rate and for generating a sampling signal after receiving clock signals equal to a count of half of said multiple and at every count thereafter equal to said multiple; and binary digit storage means connected to receive signals representative of the signals from said station and responsive to said sampling signal for storing the binary value of said signals upon generation of said sampling signal.

8. A buffering system for receiving data signals wherein said signals follow an initial pulse and are supplied during a succeeding series of information periods, the level of the signals in the information periods representing the data being supplied, said buffering system comprising a first means arranged to receive binary digit serial information from a remote station in the form of signals transmitted over a common carrier facility, said first means comprising a device for generating clock signals at a multiple of the common carrier baud rate; a second means responsive to the receipt of said initial pulse by said first means and responsive to said clock signals for counting at said multiple of the baud rate and for generating a sampling signal at a given count and at every count thereafter equal to said given count; a binary digit storage means connected to receive said signals and responsive to said sampling signal for storing the binary value of said signals when said sampling signals occurs; and a third means responsive to said initial pulse for indicating an information period.

9. A buffering system for receiving data signals wherein said signals follow an initial pulse and are supplied during a succeeding series of information periods, the levels of the signals in the information periods representing the data being supplied, said buffering system comprising a first means for receiving clock signals and responsive thereto for repetitively assuming a predetermined number of different states in succession, a second means responsive to a predetermined one of said states for generating a sampling signal, a third means responsive to said pulse for transmitting said clock signals to said first means for the duration of said pulse and said information periods, a fourth means for receiving said data signals and responsive to said sampling signal for delivering an output signal representing the level of said data signals at the moment of receipt of said sampling signal, and a fifth means for receiving said output signal and for storing a representation thereof.

10. A buffering system for receiving data signals wherein said signals follow an initial pulse and are supplied during a succeeding series of information periods, the levels of the signals in the information periods representing the data being supplied, said buffering system comprising a first means for receiving clock signals and responsive thereto for repetitively assuming a predetermined number of different states in succession, a second means responsive to a predetermined one of said states for generating a sampling signal, a third means responsive to said pulse for transmitting said clock signals to said first means for the duration of said pulse and said information periods, a fourth means for receiving said data signals and responsive to said sampling signal for delivering an output signal representing the level of said data signals at the moment of receipt of said sampling signal, a fifth means for receiving said output signal and for storing a representation thereof, and a sixth means for clearing said fifth means prior to each of said information periods.

11. A buffering system for receiving data signals wherein said signals follow an initial pulse and are supplied during a succeeding series of information periods, the levels of the signals in the information periods representing the data being supplied, said buffering system comprising a source of repetitive clock signals, a predetermined number of said clock signals occurring in each of said information periods, a first means for receiving clock signals and responsive thereto for repetitively assuming a predetermined number of different states in succession, a second means responsive to a predetermined one of said states for generating a sampling signal, a third means responsive to said pulse for transmitting said clock signals to said first means for the duration of said pulse and said information periods, a fourth means for receiving said data signals and responsive to said sampling signal for delivering an output signal representing the level of said data signals at the moment of receipt of said sampling signal, and a fifth means for receiving said output signal and for storing a representation thereof.

12. A buffering system for receiving and transmitting data signals wherein said signals follow an initial pulse and are supplied during a succeeding series of information periods, the level of the signals in the information periods representing the data being supplied, said buffering system comprising a first means arranged to receive binary digit serial information from a remote station in the form of signals transmitted over a common carrier facility, said first means comprising a device for generating clock signals at a multiple of the common carrier baud rate, a second means responsive to the receipt of said initial pulse by said first means and responsive to said clock signals for counting at said multiple of the baud rate and for generating a sampling signal at a predetermined count and at every count thereafter equal to said predetermined count, a first binary digit storage means connected to receive said signals and responsive to said sampling signal for storing the binary value of said signals when said sampling signal occurs, a second means connected to said first means for generating transmit strobe signals at the common carrier baud rate, a second binary digit storage means connected to receive signals to be transmitted, and a third means connected to said second binary digit storage means for receiving signals stored in said second storage means and responsive to said transmit strobe signals for transmitting said signals received thereby to said station.

13. A buffering system for receiving and transmitting data signals wherein said signals follow an initial pulse and are supplied during a succeeding series of information periods, the level of the signals in the information periods representing the data being supplied, said buffering system comprising a first means arranged to receive binary digit serial information from a remote station in the form of signals transmitted over a common carrier facility, said first means comprising a device for generating clock signals at a multiple of the common carrrier baud rate, a second means responsive to the receipt of said initial pulse by said first means and responsive to said clock signals for counting at said multiple of the baud rate and for generating a sampling signal at a predetermined count and at every count thereafter equal to said predetermined count, a first binary digit storage means connected to receive said signals and responsive to said sampling signal for storing the binary value of said signals when said sampling signal occurs, a second means connected to said first means for generating transmit strobe signals at the common carrier baud rate, a second binary digit storage means connected to receive signals to be transmitted, a third means connected to said second binary digit storage means for receiving information stored in said second storage means and responsive to said transmit strobe signals for transmitting said information received thereby to said station, and means responsive to said initial pulse for indicating information periods.

14. In combination, a device for receiving data signals wherein said signals follow an initial pulse and are supplied during a succeeding series of information periods, the level of the signals in the information periods representing the data being supplied, a plurality of remote stations for transmitting said signals over common carrier facilities, a buffer means for interconnecting said device and said stations for receiving from said stations and transmitting to said device binary digit serial information in the form of signals, sampling means responsive to the receipt of said pulse by said buffer means and actuated by a sampling signal for sampling the level of each succeeding signal at a predetermined point of each of the corresponding information periods, counting means responsive to said pulse for changing said count at a given rate, and means responsive to a given count of said counting means for generating a sampling signal.

15. In combination, a device for receiving and transmitting data signals wherein said signals follow an initial pulse and are supplied during a series of information periods, the level of the signals in the information periods representing the data being supplied, a plurality of remote stations, buffer means for interconnecting said device and said stations, said buffer means being connected for receiving and transmitting binary digit serial information from and to said stations in the form of signals transmitted over common carrier facilities, a first means for providing clock signals at a multiple of the common carrier baud rate, a second means responsive to the receipt of said initial pulse by said first means and to said clock signals for counting at said multiple of the baud rate and for generating a sampling signal at a predetermined count and at every count thereafter equal to said predetermined count, a first binary digit storage means connected to receive said signals from said remote stations and responsive to said sampling signal for storing the binary value of said signals when said sampling signal occurs, a third means connected to said first means for generating transmit strobe signals at the common carrier baud rate, a second binary digit storage means connected to receive signals to be transmitted from said device, and a fourth means connected to said second binary digit storage means for receiving signals stored in said second storage means and responsive to said transmit strobe signals for transmitting said signals received thereby to said stations.

16. In combination, a device for receiving and transmitting data signals wherein said signals follow an initial pulse and are supplied during a series of information periods, the level of the signals in the information periods representing the data being supplied, a plurality of remote stations, buffer means for interconnecting said device and said stations, said buffer means being connected for receiving and transmitting binary digit serial information from and to said stations in the form of signals transmitted over common carrier facilities, a first means for providing clock signals at a multiple of the common carrier baud rate, a second means responsive to the receipt of said initial pulse by said first means and responsive to said clock signals for counting at said multiple of the baud rate and for generating a sampling signal after receiving clock signals equal to a count of half of said multiple and at every count thereafter equal to said multiple, a first binary digit storage means connected to receive said signals from said remote stations and responsive to said sampling signal for storing the binary value of said signals when said sampling signal occurs, a third means connected to said first means for generating transmit strobe signals at the common carrier baud rate, a second binary digit storage means connected to receive signals to be transmitted from said device, and a fourth means connected to said second binary digit storage means for receiving signals stored in said second storage means and responsive to said transmit strobe signals for transmitting said signals received thereby to said stations.

References Cited

UNITED STATES PATENTS

| | | | |
|---|---|---|---|
| 3,061,192 | 10/1962 | Terzian | 235—157 |
| 3,245,040 | 4/1966 | Burdett et al. | 340—172.5 |
| 3,266,024 | 8/1966 | Kersey et al. | 340—172.5 |

ROBERT C. BAILEY, *Primary Examiner.*

R. ZACHE, *Assistant Examiner.*